(12) United States Patent
Guiet

(10) Patent No.: US 10,806,082 B2
(45) Date of Patent: Oct. 20, 2020

(54) GRIPPER, IMPLEMENT AND METHOD

(71) Applicant: DEERE & COMPANY, Moline, IL (US)

(72) Inventor: Lionel Guiet, Gray (FR)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/379,828

(22) Filed: Apr. 10, 2019

(65) Prior Publication Data

US 2019/0350135 A1     Nov. 21, 2019

(30) Foreign Application Priority Data

May 18, 2018 (DE) .......................... 10 2018 207 881

(51) Int. Cl.
| | | |
|---|---|---|
| A01D 87/12 | (2006.01) | |
| A01D 87/00 | (2006.01) | |
| A01F 29/00 | (2006.01) | |

(52) U.S. Cl.
CPC ......... *A01D 87/127* (2013.01); *A01D 87/003* (2013.01); *A01F 29/005* (2013.01)

(58) Field of Classification Search
CPC ............... A01D 87/127; A01D 87/003; A01D 87/0076; A01D 2087/128; A01F 29/005

USPC ................. 414/24.5, 24.6, 25, 111, 132, 332
See application file for complete search history.

(56) References Cited

U.S. PATENT DOCUMENTS

| | | | | |
|---|---|---|---|---|
| 3,455,477 | A | * | 7/1969 | Blair ......................... B60P 3/41 414/704 |
| 4,771,670 | A | * | 9/1988 | Woerman ............. A01D 87/127 144/1.1 |
| 10,506,763 | B2 | * | 12/2019 | Sargent .................... A01F 29/08 |
| 2008/0041989 | A1 | | 2/2008 | Schierman |
| 2011/0155830 | A1 | | 6/2011 | Murphy |

FOREIGN PATENT DOCUMENTS

| | | |
|---|---|---|
| EP | 2732690 A1 | 5/2014 |
| WO | 0040072 A2 | 7/2000 |

OTHER PUBLICATIONS

European Search Report issued in counterpart application No. 19174885.4 dated Sep. 23, 2019. (7 pages).

* cited by examiner

*Primary Examiner* — Lynn E Schwenning

(57) ABSTRACT

A gripper for an implement for handling bales includes a body having at least one support arm, at least one tine coupled to the body, and a cutting device. The at least one tine protrudes in a direction beyond the cutting device in at least one region.

15 Claims, 2 Drawing Sheets

GRIPPER, IMPLEMENT AND METHOD

RELATED APPLICATIONS

This application claims priority to German Patent Application Ser. No. 102018207881.5, filed May 18, 2018, the disclosure of which is hereby incorporated by reference in its entirety.

FIELD OF THE DISCLOSURE

The present disclosure relates to a gripper for an implement for handling bales, and in particular to an implement having a receiver for handling bales and to a method for handling bales such as round bales.

BACKGROUND

Known implements for handling bales are used in order to pick up, shift or transport bales and are used on industrial or agricultural vehicles such as tractors, loaders, excavators, etc. Such bales are, for example, industrial bales of materials such as textiles, refuse etc., but particularly agricultural bales of hay, straw, silage or some other crop. Bales are picked up on the field and brought directly to a storage site or loaded onto an appropriate transport vehicle. To use the crop by, for example, feeding it to a stock of animals, using it as litter or in some other way, the bale is again transported or shifted if necessary. In addition, the bale frequently has to be freed from an enveloping or enclosing wrapping material, which may be a net, film, or twine. This can require an additional tool or an additional work step, which is laborious and time-intensive. To prevent this, it has been attempted in some cases to transport the bale with the aid of a bale cutter, which requires fine control and may lead to separation of the bale at the wrong time.

SUMMARY

In the present disclosure, a gripper for an implement for handling bales has at least one tine and a cutting device, wherein the tine protrudes beyond the cutting device, at least in certain regions. In this manner, a bale can be gripped by means of the at least one tine for handling or transport by the gripper, without action on the bale or the material by the cutting device. The wrapping material is not cut and the bale can be transported with dimensional stability. If the bale is to be freed of the wrapping material, the gripper can be moved closer to the bale, whereby the tine extends more deeply into the bale and the cutting device comes into contact with the wrapping material or the bale and severs it. It is conceivable to equip an implement with a gripper of this kind at the factory or to subsequently modify the implement or to provide the gripper as an interchangeable tool.

It may be advantageous if the cutting device extends at least substantially over the width of the gripper so that the bale or a wrapping material can be cut or severed over the entire width. It is also conceivable, however, that the cutting device does not extend into peripheral regions of the gripper, or extends beyond them.

It may also be possible for the edges to be formed by the sides of the knife or (the) sides of the knife have cutting edges. The tine can protrude substantially past the knife, more particularly the tip of the knife, so that the tine can first strike the bale and engage with it and thereafter the knife can successively penetrate into the bale or the wrapping material and cut the latter. It is also conceivable, however, for the cutting device to have a cutting edge that is continuous, straight, corrugated or shaped in any other suitable manner.

If at least two tines are provided, this can assist the gripper in seizing, stabilizing or fixating the bale. Additionally, at least two knives can be provided, which can have a desirable effect on the cutting behavior of the cutting device, for example, in that the knives can each engage area by area or gradually with the bale or the wrapping material and cut the latter.

The tine(s) and the knife or knives are provided at least substantially alternatingly and are correspondingly, in particular aligned. The knife or the knives can be arranged between each two tines, or one tine can correspond to the knife, in particular be aligned with the knife or the height extending through the tip of the respective knife. If a plurality of tines or knives are provided, a combined arrangement is also conceivable, so that both one or more knives are arranged between the tines and a further knife or knives corresponds to or is aligned with a tine or tines. In addition or alternatively, tines, but no knives, can be provided in peripheral areas or on support arms of the gripper.

An implement having at least one receiver for handling bales can have a gripper as described previously that is provided such that it is movable in relation to the receiver. In particular, the implement is designed in the form of an attached implement or forms a component of such an attached implement. It is conceivable to equip the implement with a gripper of this kind at the factory or to subsequently modify the implement or to provide the gripper as an interchangeable tool. The implement is an industrial or, more particularly, an agricultural vehicle. The vehicle can be a tractor, a loader, a telescoping handler or a similar working vehicle, for example.

The receiver can be designed in the form of one or more tines, a fork or another suitable manner. In particular it is scoop-like in shape.

The gripper can be mounted such that it is movable with respect to the receiver or can be movable in another manner. It may be desirable, however, if the gripper is provided such that it can pivot. A means for selective movement of the gripper in relation to the receiver is provided. The means can be a manual device, for example. A power-generating device such as a pivot motor may be provided, however, such as in the form of a hydraulic motor or a double-acting hydraulic motor, with a hydraulic cylinder and a piston, and is supplied with hydraulic pressure by a pressure source provided on the vehicle. The pivot motor can be directly actuated, for example, but it is operated by means of a control device provided on the vehicle, for example, in the form of a joystick. Automated control or regulation is also conceivable.

According to a method for handling a bale, particularly a cylindrical bale, by means of an implement of this kind, the gripper can assume a first position relative to the receiver in which the at least one tine strikes or penetrates into the bale. The gripper may also assume at least a second position in which the cutting device cuts through the wrapping material enclosing the bale, at least in certain areas.

It may also be desirable if the gripper can be further brought or pivoted from a resting position into a receiving position, in which the tine strikes or penetrates into the bale, and further into a cutting position in which the cutting device cuts through the wrapping material, wherein the gripper is moved or pivoted beyond the receiving position for this purpose.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
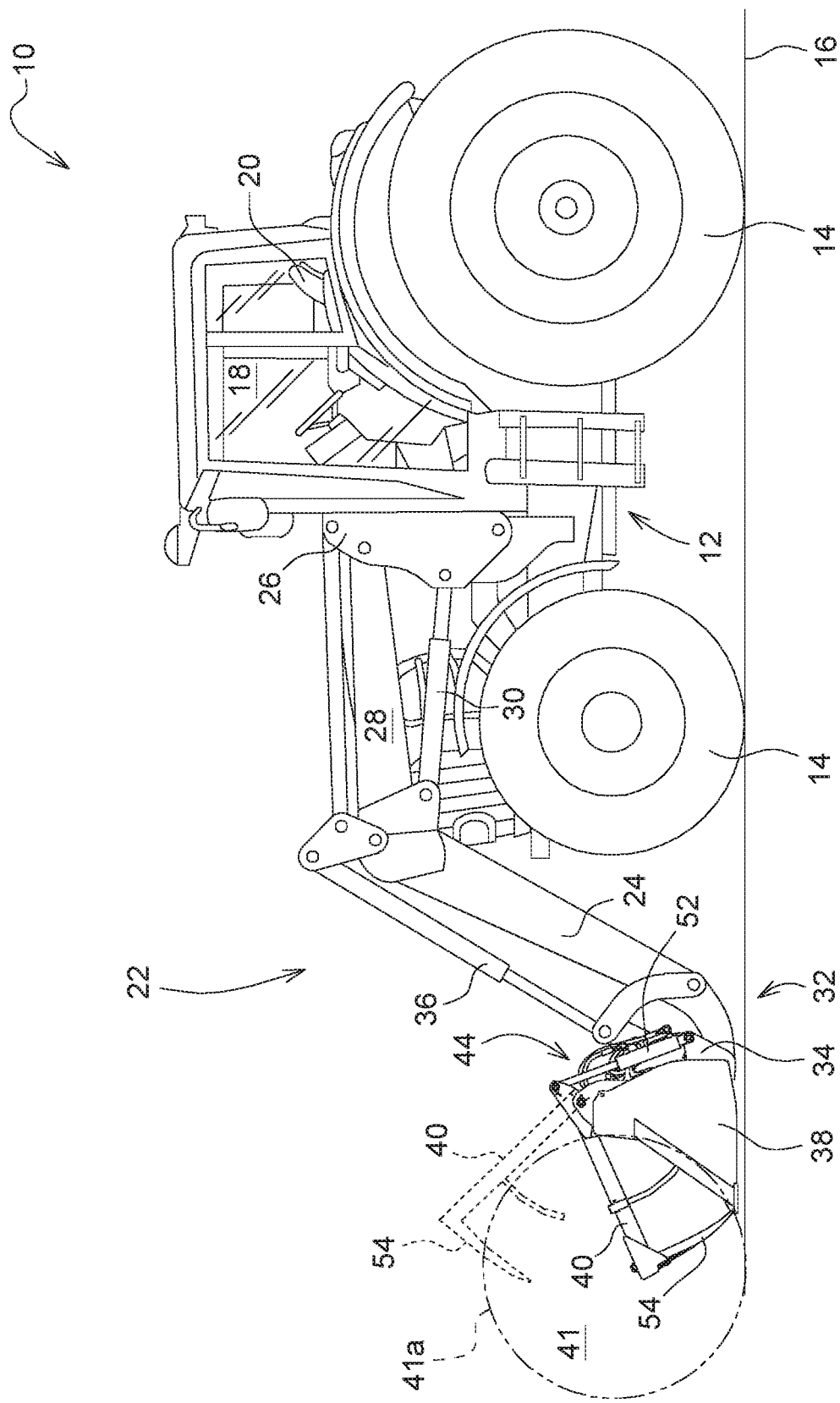
FIG. 1 shows an agricultural working vehicle having an implement comprising a receiver and a gripper for handling bales in a resting position (solid lines) and a receiving position (broken lines)

FIG. 1 of the drawing schematically represents an agricultural working vehicle 10 in the form of a tractor. The working vehicle 10 is designed to be self-propelled and has a frame 12 that is supported on the ground 16 by wheels 14. The working vehicle 10 additionally has a cab 18 with an operator seat 20 for an operator.

A loader device 22 in the form of a front loader is provided on the working vehicle. The loader device 22 comprises a loader arm 24 that can be attached to both sides of the working vehicle 10, wherein the loader arm 24 can be coupled according to the embodiment shown to the working vehicle 10 by means of an attachment bracket 26 connected to the frame 12.

The loader arm 24 comprises parallel supports 28 on each side of the working vehicle 10, which are connected to one another by means of a cross brace (not shown) and can be pivoted via hydraulic lift cylinders 30 that likewise extend on both sides of the working vehicle 10. The implement 34 is pivotably received at a free end 32 of the loader arm 24 by means of a hydraulic pivot cylinder 36.

Figure 2:
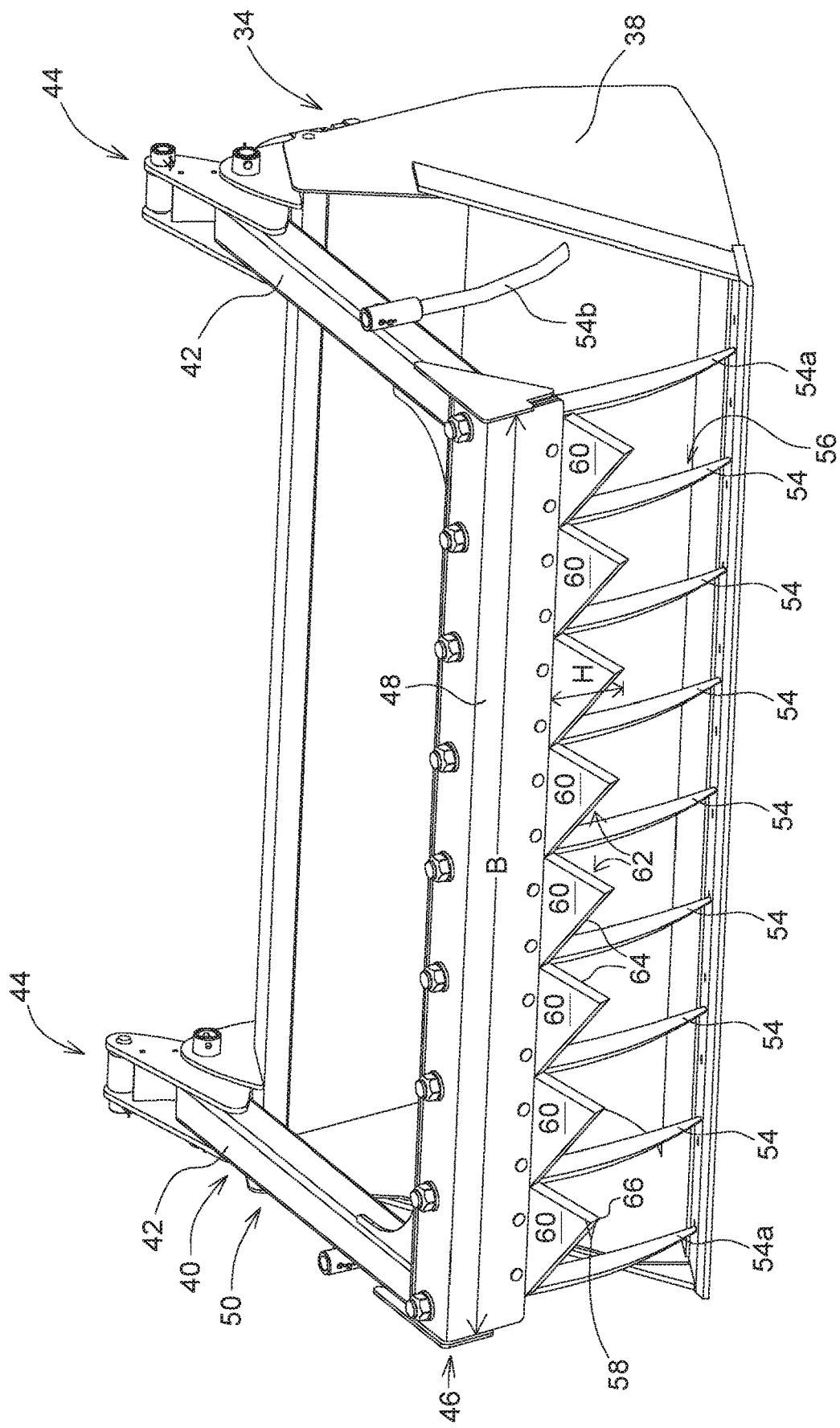
FIG. 2 shows the implement from FIG. 1 in an enlarged representation.

Referring to FIG. 2, the implement 34 is shown alone in a perspective representation. The implement 34 has a receiver 38 and a gripper 40, wherein the gripper 40 can assume a resting position shown in solid lines in FIG. 1, and a transport position shown in broken lines in FIG. 1. The receiver 38 is formed as a scoop, which is suitable to pick up a bale 41 such as a cylindrical agricultural bale consisting of crop, in order to handle or transport it. A different material, however, such as bulk material, crop, earth or the like, or also bales with a different shape such as square bales, or industrial bales can be picked up or handled by means of the receiver 38.

The gripper 40 is used for securing the material received by the receiver 38 and includes a body having two support arms 42, which are pivotably connected to the receiver 38 on the left and right sides via a respective joint 44. In a region 46 facing away from the working vehicle 10, the support arms 38 are connected by means of a cross-member 48 in such a way that together they form a pivot frame 50. In addition, a power-generating device such as a pivot motor 52, only implicitly indicated in the representation, is provided which can be controlled via a control means or controller (not shown) provided in the cab 18 of the working vehicle 10 such that the gripper 40 or the pivot frame 50 can be moved or pivoted. The pivot motor 52 can be formed as a hydraulic motor having a hydraulic cylinder and a piston, in particular a double-acting hydraulic motor, which can be supplied with hydraulic pressure by the working vehicle 10.

A plurality of tines 54, spaced apart approximately equally, are provided on the cross-member 48 and extend approximately perpendicularly from the cross-member 48 in the direction of the receiver 38 and terminate in a point at the end region 56 facing away from the cross-member 48. The tines 54 farthest to the outside are each designated below as tines 54a. The support arms 42 also each have a correspondingly formed tine 54, which is a distance away from the cross-member 48 and will be called tine 54b below. According to the present embodiment, the tines 54, 54a are detachably mounted on the cross-member 48, more particularly bolted on, and are spaced apart approximately equally. Other arrangements are also conceivable, and thus the tines 54, 54a, 54b can be unevenly spaced apart or also arranged in groups. It is also conceivable to provide a total of only one tine 54, 54a, 54b on the cross-member 48 or only one or also multiple tines 54, 54a, 54b on one or both support arms 42.

In addition, a cutting device 58, which extends substantially over a width B of the cross-member 48, is provided on the cross-member 48. The cutting device 58 is mounted on the cross-member 48 and has a plurality of tooth-like knives 60. The knives 60 are formed like equilateral triangles and have two sides 60 formed as cutting edges 62, which meet one another in a tip 66 facing away from the cross-member 48.

The cutting device 58 is arranged on the cross-member 48 in front of the tines 54 in relation to the ordinary travel direction of the working vehicle 10, wherein the tines 54 protrude substantially beyond the tips 66 or the height H of the knives 60. It is alternatively conceivable that the tines 54 are arranged at least substantially aligned with the knives 60 or the height H of the knives.

To pick up a bale (41, see FIG. 1) with the implement 34, the gripper 40 is brought by means of the pivot motor 52 into a receiving position pivoted substantially upward relative to the receiver 38 (see FIG. 1, representation in broken lines), in which the gripper 40 does not interact with the bale 41. If the bale 41 has been received by the receiver 38, then the gripper 40 is pivoted downward or in the direction of the bale 41 such that the tines 54, 54a, 54b or at least some of the tines 54, 54a, 54b engage with the bale 41 by means of their pointed end regions 56. The cutting device 58 does not interact in this position either with the bale 41 or the wrapping material 41a, whereby the bale stably retains its shape and easy transport/handling is achieved.

If it is further intended for the gripper 40 to cut through the wrapping material 41a surrounding the bale 41 or if the bale 41 is to be broken open, the pivot motor 52 pivots the gripper 40 such that the cutting device 58 is led up to the bale 41 and engages by means of its knives 60 with the bale 41, so that the cutting edges 62 cut through the wrapping material 41a.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A gripper for an implement for handling bales, the gripper comprising:
    a body including a pair of support arms and a cross member extending between the pair of support arms;
    at least one tine attached to the cross member and extending away from the cross member in a direction;
    a cutter having a plurality of knives spaced apart from each other along a width of the cross member, wherein the cutter is attached to the cross member with each of the plurality of knives extending from the cross member in the direction of the at least one tine;
    wherein the at least one tine extends a distance from the cross member that is greater than a height of each of the plurality of knives from the cross member; and
    wherein the at least one tine and the plurality of knives are arranged in an alternating alignment along the width of the cross member.

2. The gripper of claim 1, wherein the cutter extends at least substantially over a width of the cross member.

3. The gripper of claim 1, wherein each of the plurality if knives extends to a respective tip.

4. The gripper of claim 3, further comprising cutting edges formed by one or more sides of each respective one of the plurality of knives.

5. The gripper of claim 3, wherein the at least one tine protrudes substantially beyond the tip of each respective one of the plurality of knives.

6. The gripper of claim 3, wherein the at least one tine includes a plurality of tines, with each respective one of the plurality of tines arranged along the width of the cross member between the tips of an adjacent pair of the plurality of knives.

7. An implement for handling a bale, the implement comprising:
    a receiver configured to pick up the bale;
    a gripper rotatably attached to the receiver, wherein the gripper includes:
        a body including a pair of support arms and a cross member extending between the pair of support arms;
        at least one tine attached to the cross member and extending away from the cross member in a direction;
        a cutter having a plurality of knives spaced apart from each other along a width of the cross member, wherein the cutter is attached to the cross member with each of the plurality of knives extending from the cross member in the direction of the at least one tine;
        wherein the at least one tine extends a distance from the cross member that is greater than a height of each of the plurality of knives from the cross member; and
        wherein the at least one tine and the plurality of knives are arranged in an alternating alignment along the width of the cross member.

8. The implement of claim 7, wherein the receiver comprises a scoop.

9. The implement of claim 7, further comprising a pivot motor interconnecting the receiver and the gripper for selectively controlling movement of the gripper relative to the receiver.

10. The implement of claim 9, wherein the pivot motor includes a hydraulic motor or a hydraulic cylinder.

11. The implement of claim 7, wherein the cutter extends at least substantially over a width of the gripper.

12. The implement of claim 7, wherein each of the plurality of knives extends to a respective tip.

13. The implement of claim 12, further comprising cutting edges formed by one or more sides of each respective one of the plurality of knives.

14. The implement of claim 12, wherein the at least one tine protrudes substantially beyond the tip of each respective one of the plurality of knives.

15. The implement of claim 12, wherein the at least one tine includes a plurality of tines, with each respective one of the plurality of tines arranged along the width of the cross member between the tips of an adjacent pair of the plurality of knives.

* * * * *